INVENTORS
FRANCIS E. HAMILTON
ERNEST S. HUGHES, JR.
BY John P. Darity
ATTORNEY

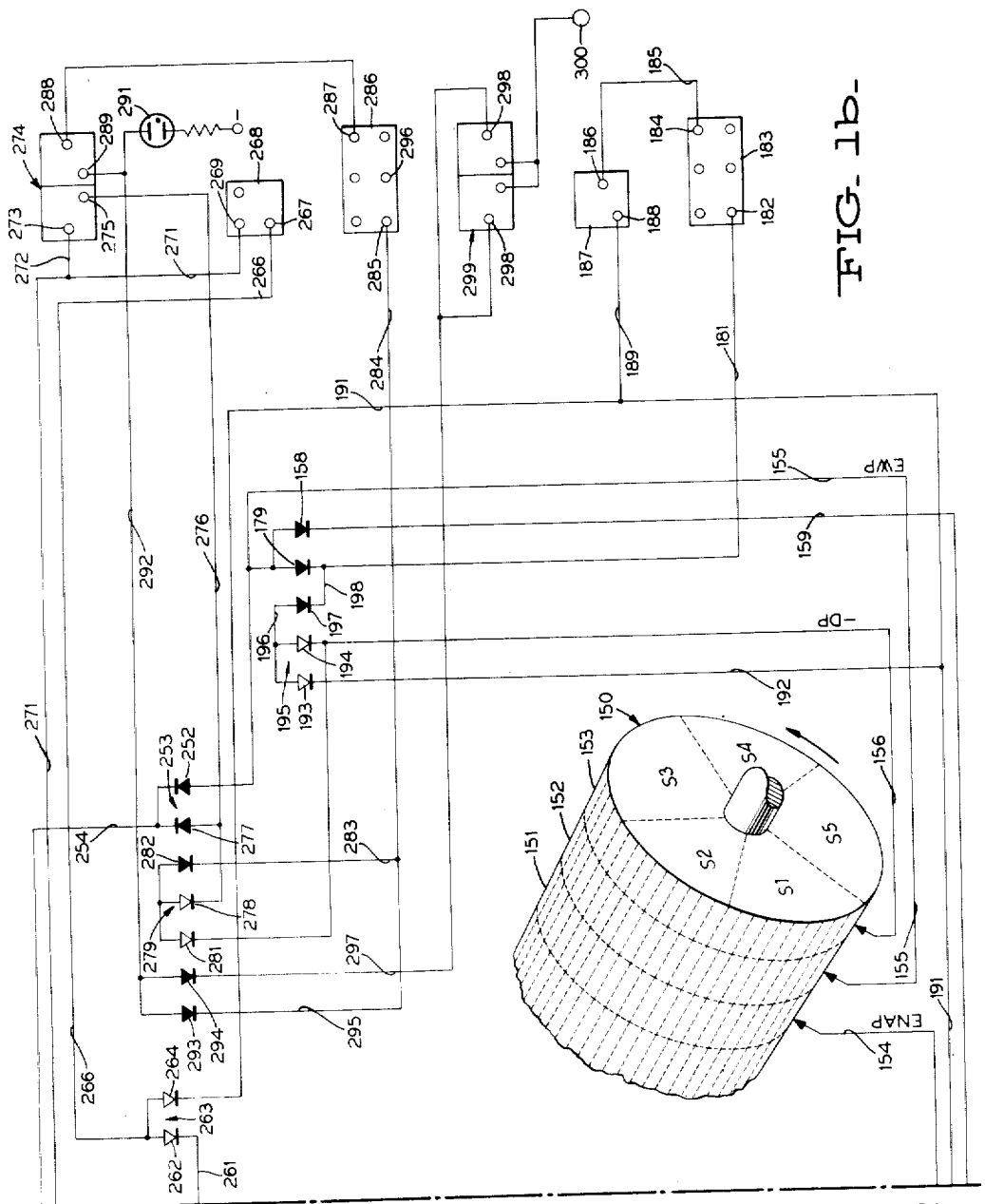

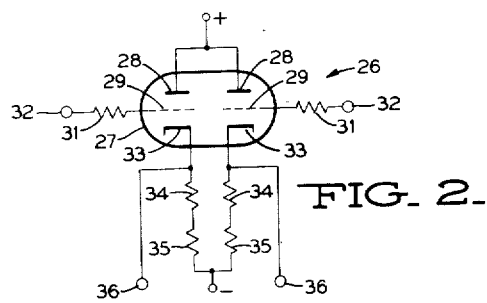
FIG. 2.
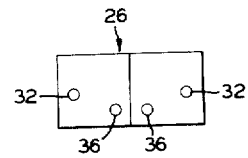
FIG. 3.
FIG. 5.
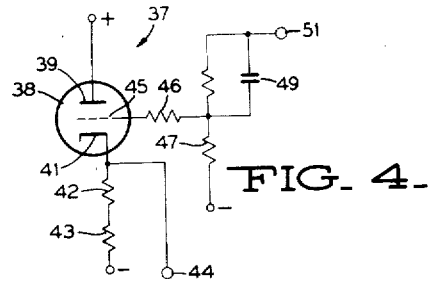
FIG. 4.
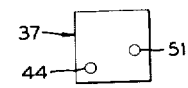
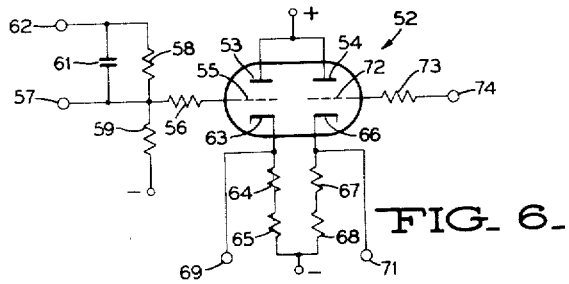
FIG. 6.
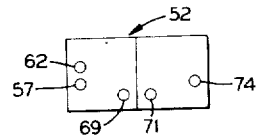
FIG. 7.
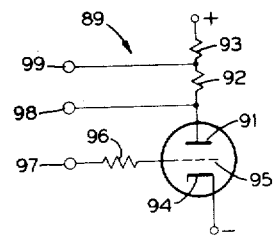
FIG. 10.
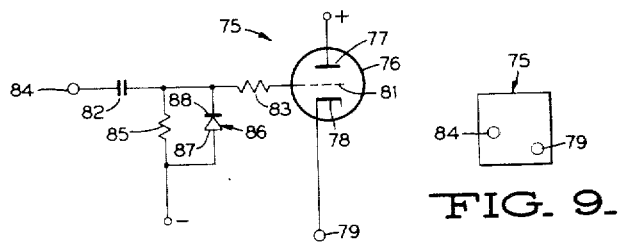
FIG. 8.
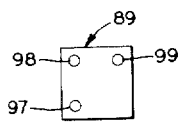
FIG. 9.
FIG. 11.
INVENTORS
FRANCIS E. HAMILTON
ERNEST S. HUGHES, JR.
BY John P. Darity
ATTORNEY Jan. 7, 1958 F. E. HAMILTON ET AL 2,819,457
TIMING AND CLOCKING CIRCUITS
Filed Feb. 8, 1954 5 Sheets-Sheet 4

*INVENTORS*
FRANCIS E. HAMILTON
ERNEST S. HUGHES, JR.
BY John P. Darity
*ATTORNEY*

Jan. 7, 1958   F. E. HAMILTON ET AL   2,819,457
TIMING AND CLOCKING CIRCUITS
Filed Feb. 8, 1954   5 Sheets-Sheet 5

INVENTORS
FRANCIS E. HAMILTON
ERNEST S. HUGHES, JR.
BY
ATTORNEY

United States Patent Office 2,819,457
Patented Jan. 7, 1958

2,819,457

TIMING AND CLOCKING CIRCUITS

Francis E. Hamilton, Binghamton, and Ernest S. Hughes, Jr., Vestal, N. Y., assignors to International Business Machines Corporation, New York, N. Y., a corporation of New York Application February 8, 1954, Serial No. 408,702

9 Claims. (Cl. 340—253)

This invention relates to data processing machines and particularly to timing and clocking mechanism therefor.

In data processing machines many operations are under the control of timing and clocking mechanism, and the accuracy with which these operations are performed can be no greater than the accuracy of the timing and clocking mechanism. Heretofore errors introduced by the timing and clocking mechanism have often gone undetected by the data processing machine, thus producing erroneous results.

It is a prime object of this invention to provide improved timing and clocking mechanism for a data processing machine.

Another object is to provide a data processing machine with improved timing and clocking mechanism with means for detecting errors arising in the timing and clocking mechanism.

Still another object of this invention is to provide improved error detecting means for timing and clocking circuits.

Another object is to provide checking circuits for the timing and clocking mechanism of a data processing machine.

A further object is to provide improved circuitry for checking the operation of a ring.

According to the embodiment of the invention shown herein an open-ended ring is driven by signals derived from spots magnetically recorded on a rotating drum. A signal initiating each cycle of the ring is compared for concurrence with a signal derived upon the completion of each preceding cycle of the ring. Lack of concurrence indicates an error.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1*a* and 1*b* comprise a block diagram of a timing and clocking circuit embodying the present invention. Figs. 2 through 17 show the details of the various blocks shown throughout Figs. 1*a* and 1*b*.

Figure 1A:
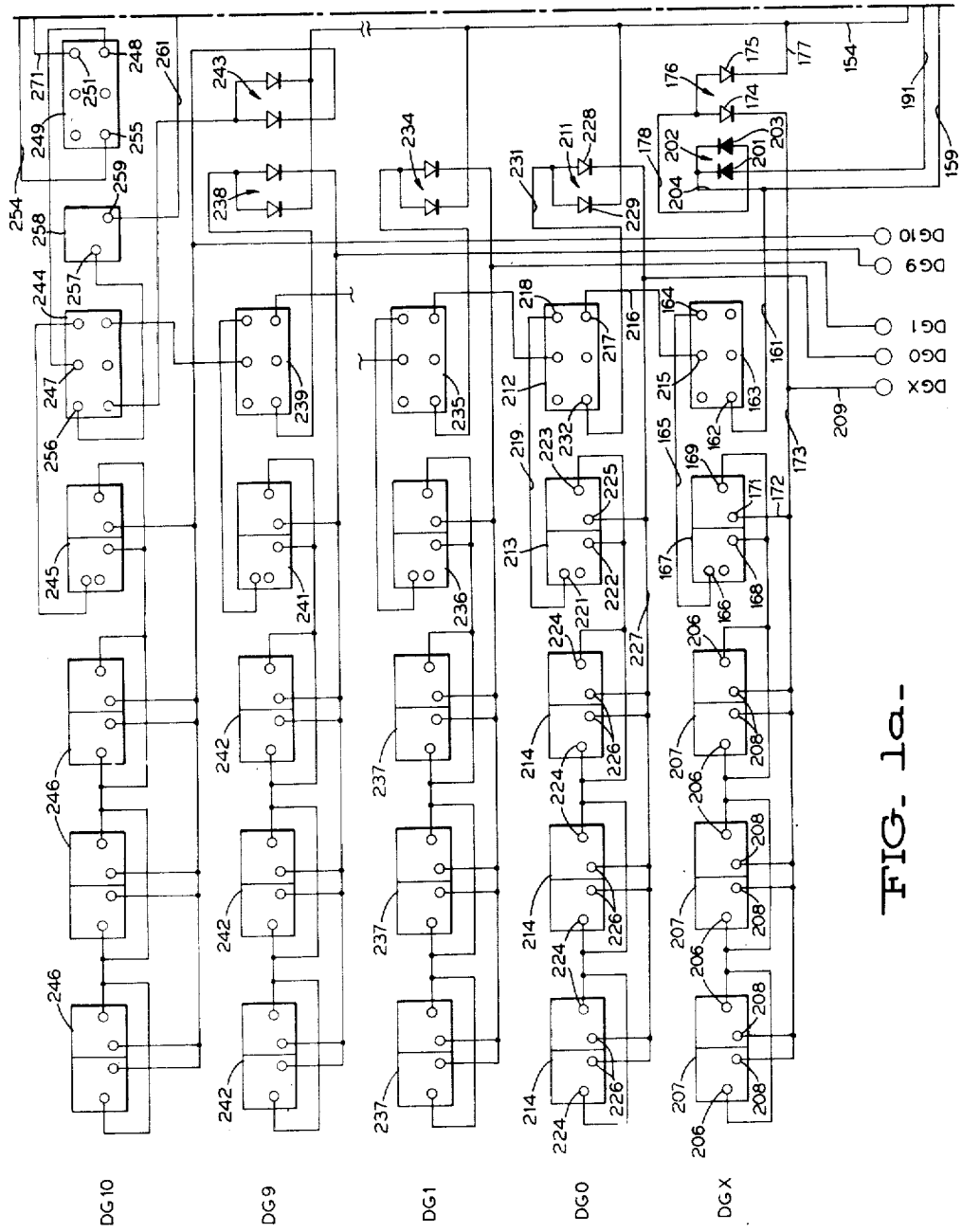

Attention will first be given to various typical forms of tube and diode circuits which are shown diagrammatically in block form in Figs. 1*a* and 1*b*. Fig. 3 represents in block or rectangle form a type of double cathode follower unit 26. This unit is shown schematically in Fig. 2 where it is seen to comprise a twin triode tube 27 having its two plates 28 connected together and to a positive source of potential, not shown. Each grid 29 is connected through a current limiting resistor 31 to a terminal 32, and each cathode 33 is connected through cathode resistors 34 and 35 to a negative source of potential, not shown. Each cathode is also connected to a terminal 36 from which outputs from the cathode followers may be taken.

Fig. 5 represents in block form a type of cathode follower unit 37. This unit is shown schematically in Fig. 4 where it is seen to comprise a triode tube 38 having its plate 39 connected to a positive source of potential, not shown, and its cathode 41 connected through resistors 42 and 43 to a negative source of potential, not shown. Cathode 41 is also connected to a terminal 44 from which the output of the cathode follower may be taken. The grid 45 is connected through a grid current limiting resistor 46 and a voltage level establishing network including resistors 47 and 48 and condenser 49 to a terminal 51 from which signals may be applied to the cathode follower 37.

Fig. 7 represents in block form another type of double cathode follower unit 52. This unit is shown schematically in Fig. 6 where it is seen to comprise a twin triode cathode follower amplifier in which the plate 53 of the first triode is connected to plate 54 of the second triode and both are connected to a source of positive potential, not shown. The grid 55 of the first triode is connected through a grid current limiting resistor 56 to a terminal 57 and through a voltage level establishing network including resistors 58 and 59 and condenser 61 to a terminal 62. The cathode 63 of the first triode is connected through resistors 64 and 65 to a source of negative potential, not shown, and the cathode 66 of the second triode is connected through resistors 67 and 68 to the same source of negative potential. Cathodes 63 and 66, respectively, are connected to terminals 69 and 71, respectively, from which output signals may be taken from the two respective cathode follower amplifiers. The grid 72 of the second triode is connected through grid current limiting resistor 73 to a terminal 74 to which may be supplied input signals.

Fig. 9 represents in block form still another type of cathode follower unit 75. This unit is shown schematically in Fig. 8 where it is seen to comprise a triode 76 having its plate 77 connected to a source of positive potential, not shown, and having its cathode 78 connected to a terminal 79. The grid 81 of triode 76 is capacitively coupled through capacitor 82 and grid current limiting resistor 83 to a terminal 84. A biasing and voltage limiting network including resistor 85 and diode 86 connects the junction of resistor 83 and capacitor 82 to a source of negative voltage, not shown. Diode 86 includes an anode 87 and a cathode 88, thus grid 81 is prevented from going more negative than the source of negative potential.

Fig. 11 represents in block form a type of inverter amplifier unit 89. This unit is shown schematically in Fig. 10 where it is seen to comprise a triode amplifier in which the plate 91 of the triode is connected through resistors 92 and 93 to a source of positive potential, not shown. The cathode 94 of the triode is connected to ground, and the grid 95 is connected through a grid current limiting resistor 96 to a terminal 97 to which input signals to the inverter amplifier may be applied. Plate 91 is connected to a terminal 98 from which an output from the inverter amplifier may be taken. An additional output is provided at a terminal 99 which is connected at the junction of resistors 92 and 93.

Figure 12:
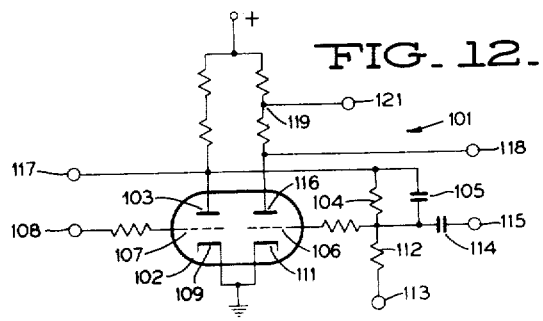
Figure 13:
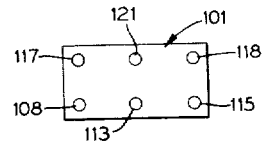

Fig. 13 represents in block form a type of double inverter unit 101. This unit is shown schematically in Fig. 12, where it is seen to comprise a twin triode amplifier 102 in which the plate 103 of the first triode is coupled through a resistor 104 and capacitor 105 to the grid 106 of the second triode. The grid 107 of the first triode is connected to an input terminal 108. The cathodes 109 and 111 have a common ground connection as shown. The grid 106 is connected through a resistor 112 to a terminal 113, and is also coupled by a capacitor 114 to a terminal 115. Terminal 113 is connected to a negative source of potential, not shown. The plates 103 and 116 of the first and second triodes, respectively, are connected to plate terminals 117 and 118. The plate circuit of the second triode also has a tap 119 connected to a tap terminal 121.

The operation of the double inverter shown in Figs. 12 and 13 is such that when a positive pulse is applied to the input terminal 108, the resulting drop of voltage at the plate 103 is communicated to the grid 106, causing a rise in voltage at the plate 116. Hence, a positive output voltage pulse is available at the terminal 118 or 121, and a negative output pulse is available at the terminal 117. As will be explained subsequently, a double inverter shown in Figs. 12 and 13 is adapted to be used in conjunction with a cathode follower to provide a latch unit. When used in this fashion, the unit is turned "on" by a positive pulse applied to the input terminal 108, and may be turned "off" or reset by the application of a positive pulse to the terminal 113 or 115.

Figure 15:
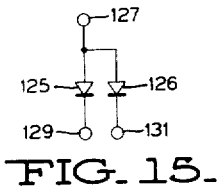
Figure 14:
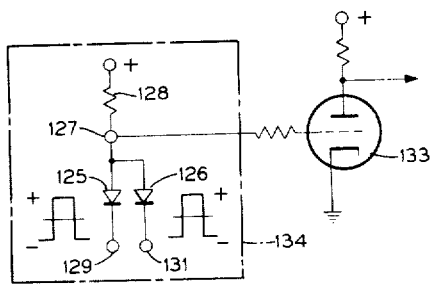

In Fig. 14 there is shown a typical coincidence switch, otherwise known as a logical "and" circuit comprising the germanium crystal diodes 125 and 126. The common terminal 127 of the diodes 125 and 126 is connected through a voltage dropping resistance 128 to a source of positive voltage, not shown. The individual input terminals 129 and 131 of the diodes 125 and 126 are normally biased negatively so that the common terminal 127 is normally at a negative potential with respect to ground. If coincident positive pulses are applied to the terminals 129 and 131, the potential of the terminal 127 is raised. However, if only one of the terminals 129 and 131 is pulsed positively, the potential of the terminal 127 is not raised appreciably. A voltage responsive device, such as an electron tube amplifier 133, is controlled by the potential of the terminal 127 to furnish a usable output voltage pulse whenever a coincidence of positive input pulses is detected. For simplicity, the portion of the coincidence switch shown in the broken line rectangle 134, Fig. 14, is generally represented as shown in Fig. 15, omitting the dropping resistor 128 and the connection to the positive voltage source.

Figure 16:
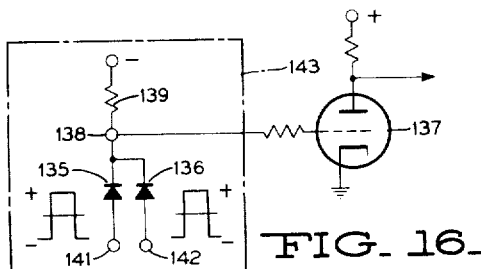
Figure 17:
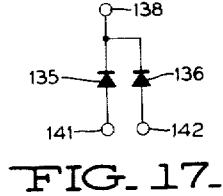

In Fig. 16 there is shown a typical mixer, otherwise known as a logical "or" circuit, comprising the diodes 135 and 136. Diodes which are employed in mixers are shaded in the present drawings to distinguish them from the diodes which are employed in switches. A voltage responsive device, represented by the electron tube amplifier 137, is controlled by the potential of the common output terminal 138 of the diodes 135 and 136, which terminal is connected by a resistor 139 to a source of negative voltage, not shown. If either one (or both) of the diode input terminals 141 and 142 is pulsed positively, the potential of the terminal 138 is raised. For convenience, the portion of the mixer circuit shown in the broken line rectangle 143, Fig. 16, is generally represented as shown in Fig. 17, omitting the resistor 139 and the connection to the negative voltage source.

Figure 18:
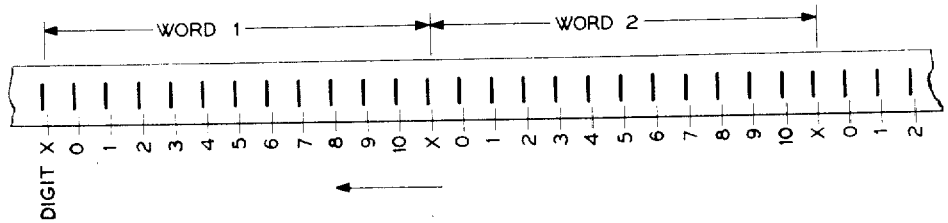
Fig. 18 shows diagrammatically a fragmentary section on one track of a drum and the arrangement of the magnetic timing spots thereon.
Figure 19:
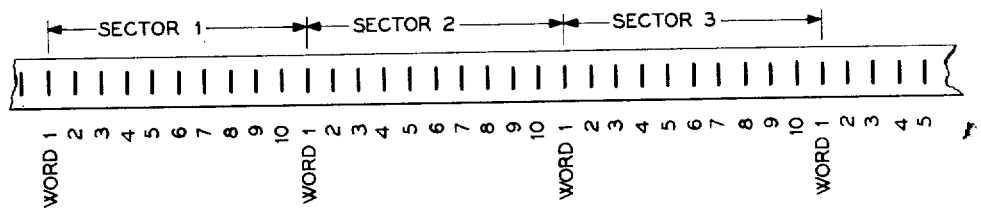
Fig. 19 shows a fragmentary section of another track of the drum similar to that of Fig. 18.
Figure 20:
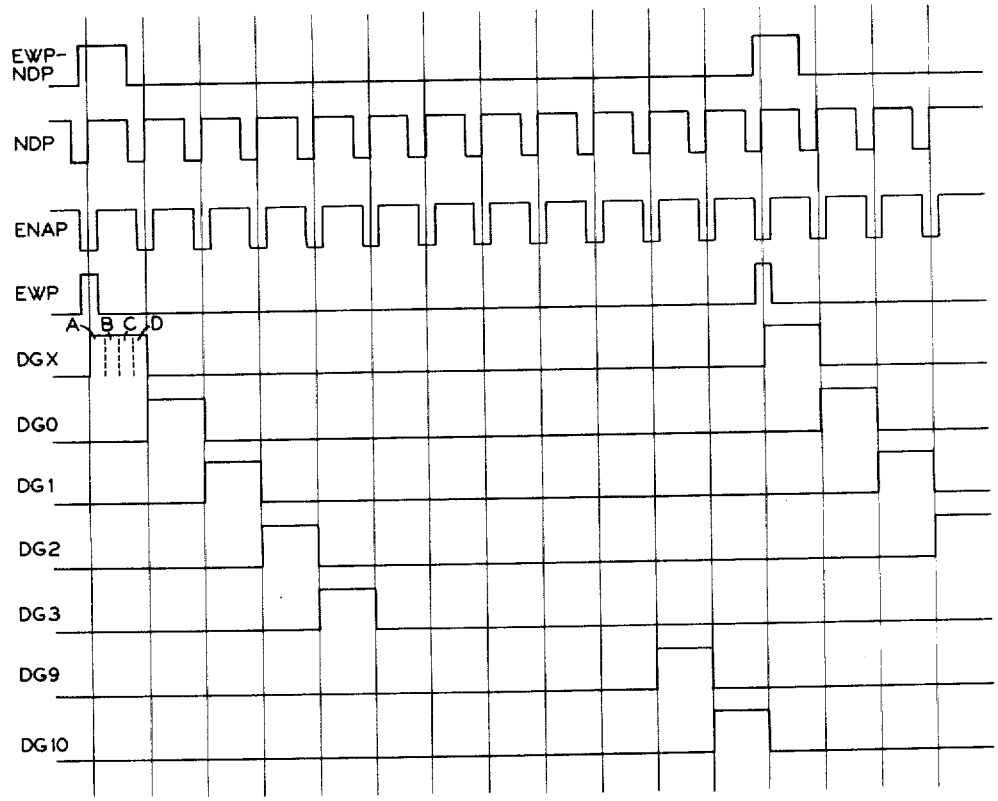
Fig. 20 shows representative wave forms, to a common time base, of voltages occurring at various points throughout Figs. 1*a* and 1*b*.

Referring to Figs. 1a and 1b there is shown in Fig. 1b a rotating magnetic drum 150 arbitrarily divided into five sectors S1, S2, S3, S4, and S5, respectively. Each sector is divided into ten words and each word is divided into twelve digits as shown in Fig. 18. The drum 150 includes tracks 151, 152, and 153 and each of these tracks may have associated therewith a magnetic head assembly and associated amplifier circuitry built in accordance with techniques well known to the art. Track 151 may have magnetic spots recorded and arranged thereon as shown diagrammatically in Fig. 18 and track 152 may have spots recorded and arranged thereon as shown diagrammatically in Fig. 19. Pulses shown as "early negative A pulses" (ENAP) in Fig. 20 may be derived from track 151 and pulses shown as "early word pulses" (EWP) in Fig. 20 may be derived from track 152. Track 153 also has magnetic spots recorded thereon and pulses shown as "negative D pulses" (NDP) in Fig. 20 may be derived therefrom according to techniques well known to the art. The pulses derived from tracks 151, 152, and 153 respectively appear on lines 154, 155, and 156 respectively.

Each elementary period of the timing sequence contains what are known as "A," "B," "C," and "D" points. The "A" point comes at the beginning of the period, the "B" point one-fourth of the way through the period, the "C" point at the middle of the period, and the "D" point three-quarters of the way through the period. "A" pulses are short timing pulses which are initiated at the "A" points and terminate at the "B" points. "B" pulses are initiated at "B" points and terminate at "C" points, and so on. An "early A pulse" is a pulse that is initiated approximately one micro-second earlier than an "A" pulse and terminated approximately one micro-second earlier than an "A" pulse. "Early" pulses are utilized when it is necessary to compensate for a time lag introduced by an electronic component such as an amplifier.

In order to derive gate pulses extending over the elementary periods of timing (digit gate pulses, DG), "early negative A pulses" (ENAP) and "early word pulses" (EWP), derived from tracks on the magnetic drum, are utilized. An "early word pulse" (EWP) appearing on line 155 (Fig. 1b) is fed through an isolating diode 158, over line 159, over line 161, and to the grid terminal 162 of a double inverter 163 (similar to the unit shown in Figs. 12 and 13) to cause a positive output voltage from the plate terminal 164. The output from terminal 164 is fed over line 165 to the input terminal 166 of a double cathode follower unit 167 (similar to the unit shown in Figs. 6 and 7) to cause a positive output voltage from the cathode terminal 168. The output from terminal 168 is fed to the input terminal 169 of the cathode follower unit 167 to cause a positive output voltage from cathode terminal 171. The output from terminal 171 is fed over line 172, over line 173 and to diode 174. Diode 174 in conjunction with a diode 175 form a switch 176. "Early negative A pulses" (ENAP) are supplied to diode 175 of switch 176 over lines 154 and 177. Switch 176 will therefore pass positive voltage pulses appearing on line 173 to a line 178 except during the time of an "early negative A pulse."

The "early word pulses" appearing on line 155 are also fed through an isolating diode 179, over line 181, and to the grid terminal 182 of a double inverter 183 to cause a positive output voltage from the plate terminal 184. The output from terminal 184 is fed over line 185 to the input terminal 186 of a cathode follower 187 (similar to the unit shown in Figs. 4 and 5) to cause a positive output voltage at the cathode terminal 188. The output from terminal 188 is fed over line 189, over line 191, and over line 192 to a diode 193. Diode 193 in conjunction with a diode 194 form a switch 195. "Negative D pulses" (NDP) are applied to diode 194 of switch 195 from line 156 so that switch 195 will pass a positive potential appearing on line 192 to a line 196 and thus through isolating diode 197 except during the time of "negative D pulses." The positive voltage appearing on line 192 is thus passed by switch 195 through diode 197 to a line 198, to line 181, and to the terminal 182 of double inverter 183 to latch the double inverter in the "on" condition. This condition will persist until a "negative D pulse" (NDP) occurs to block the passage of the positive voltage from line 192 to line 181 at which time the latching action will cease. The voltage wave form appearing at terminal 188 of cathode follower 187 as a result of this latching action is shown schematically at EWP—NDP in Fig. 20.

The output from cathode follower 187 is also applied over line 191 to the diode 201 (Fig. 1a) of a mixer 202. Mixer 202 also includes a diode 203. The output from mixer 202 is fed over line 204 and line 161 to the terminal 162 of double inverter 163 to maintain double inverter 163 in the "on" condition for the duration of the output of cathode follower 187 (Fig. 1b). The output from switch 176 is fed to diode 203 of mixer 202 over line 178 so that double inverter 163 remains latched "on" until the occurrence of an "early negative A pulse" (ENAP), at which time the latching action ceases and the potential at the plate terminal 164 drops.

The output from the cathode terminal 168 of double cathode follower 167 is also applied to each of the input grid terminals 206 of each of a group of double cathode follower units 207 (similar to the unit shown in Figs. 2 and 3). The output cathode terminals 208 of each of the double cathode followers 207 are connected to the line 173. This arrangement provides a large amount of power to drive various components of a data processing machine. The line 173 is connected to a line 209 and thus to the terminal labeled DGX. The voltage wave form appearing on line 173 and thus on terminal DGX is shown schematically at DGX in Fig. 20. A time lag of approximately one micro-second is introduced by the cathode followers 207 and 167 and the double inverter 163 to thus produce a DGX gate pulse of the desired timing. The double inverter 163 and the cathode followers 167 and 207 with switch 176 comprise the first stage or the DGX stage of an open ended ring circuit or commutator. The second stage or the DG0 stage of this ring is comprised of switch 211, double inverter 212, double cathode follower 213, and double cathode followers 214.

Terminal 215 of double inverter 163 is connected by line 216 to terminal 217 of double inverter 212. As the DGX stage of the ring goes "off" in response to an "early negative A pulse" (ENAP), a negative going signal is applied to the grid of the right-hand triode of double inverter 212 since this grid is capacitively coupled to terminal 217. This negative going signal produces a positive output voltage at plate terminal 218. The output from terminal 218 is applied over line 219 to the input terminal 221 of the double cathode follower 213 to produce a positive output voltage at terminal 222. The output from terminal 222 is coupled to the input terminal 223 of double cathode follower 213 and to the input terminals 224 of each of the double cathode followers 214 to produce a positive output voltage at terminal 225 of double cathode follower 213 and at terminals 226 of double cathode followers 214. The output from terminals 225 and 226 is connected over line 227 to diode 228 of switch 211. Diode 229 of switch 211 is connected to line 154 and thus has "early negative A pulses" (ENAP) applied thereto. A positive voltage appearing on line 227 is thus passed by switch 211 to a line 231 except during the time of an "early negative A pulse." Line 231 is connected to input terminal 232 of double inverter 212. Double inverter 212 therefore remains latched "on" from the time that the DGX stage of the ring goes "off" until the next succeeding "early negative A pulse" (ENAP), at which time the DG0 stage of the ring goes "off" to turn the next stage or the DG1 stage of the ring "on." The output from the DG0 stage of the ring is taken from line 227 through the terminal labeled DG0. The voltage wave form appearing at terminal DG0 may be seen at DG0 in Fig. 20. The DG1 stage of the ring includes switch 234, double inverter 235, double cathode follower 236, and double cathode followers 237. As the DG1 stage of the ring is turned "off" by an "early negative A pulse" (ENAP) the DG2 stage of the ring is turned "on," etc., until the DG10 stage of the ring is turned "on" by the DG9 stage going "off." The DG9 stage of the ring includes a switch 238, a double inverter 239, a double cathode follower 241, and double cathode followers 242. The DG10 stage of the ring includes a switch 243, a double inverter 244, a double cathode follower 245, and double cathode followers 246.

When the DG10 stage of the ring goes "off" the ring has completed a cycle, and during the cycle will have supplied twelve digit gate pulses, DGX through DG10. An "early word pulse" (EWP) initiates the ring cycle and an "early negative A pulse" (ENAP) terminates the cycle by turning the DG10 stage "off." The "early negative A pulse" (ENAP) that turned the DG10 stage of the ring "off" should coincide in time with the "early word pulse" (EWP) that starts the next succeeding cycle of the ring. If the DG10 stage of the ring does not go "off" concurrently with the occurrence of an "early word pulse" (EWP) an error in the ring operation or in the timing pulses from the magnetic drum must have occurred. The checking circuitry for detecting such an error will be presently described.

Terminal 247 of double inverter 244 is connected to the terminal 248 of a double inverter 249. As the DG10 stage of the ring goes "off" a positive going signal will be produced at the terminal 251 of double inverter 249. Line 155, on which appear "early word pulses" (EWP), is connected to diode 252 of mixer (Fig. 1b). The output of mixer 253 is fed over line 254 to the terminal 255 of double inverter 249 (Fig. 1a). An "early word pulse" (EWP) will thus produce a positive voltage out put at the terminal 251. Either the going "off" of the DG10 stage of the ring or the occurrence of an "early word pulse" (EWP), or both, will produce a positive voltage output at terminal 251 of double inverter 249 or cut off conduction of the right-hand triode of double inverter 249.

Terminal 256 of double inverter 244 is connected to terminal 257 of a cathode follower 258. As the DG10 stage of the ring goes "off" a positive voltage will be produced at the terminal 259 of cathode follower 258. The output voltage from terminal 259 is fed over line 261 to diode 262 of a switch 263 (Fig. 1b). As explained above a voltage pulse initiated by each "early word pulse" (EWP) and terminated by the next succeeding "negative D pulse" (NDP) appears on terminal 188 of cathode follower 187. This voltage pulse (EWP—NDP) is fed over lines 189 and 191 to the diode 264 of switch 263. Thus the coincidence of an output from terminal 188 of cathode follower 187 and an output from terminal 259 of cathode follower 258 (Fig. 1a), will produce an output from switch 263. The output from switch 263 is fed over line 266 to the input terminal 267 of an inverter 268 to produce a negative output voltage at terminal 269. Terminal 269 of inverter 268 is connected by line 271 to terminal 251 of double inverter 249 (Fig. 1a). Line 271 is connected by line 272 to the input terminal 273 of a double cathode follower 274 (Fig. 1b).

If the right-hand triode of double inverter 249 is cut off by a signal applied to either terminal 255 or 248 (Fig. 1a), and no positive voltage signal is fed to terminal 267 of inverter 268, then a positive output signal will appear on the output terminal 275 of double cathode follower 274. That is, if either an "early word pulse" (EWP) occurs or the DG10 stage of the ring goes "off" without the occurrence of both, a positive output voltage is produced at terminal 275 of double cathode follower 274.

An output from terminal 275 is fed over line 276 to diode 277 of mixer 253. Since the output of mixer 253 is fed to terminal 255 of double inverter 249 (Fig. 1a), an output is maintained from terminal 275 of double cathode follower 274 (Fig. 1b), until such time as the DG10 stage of the ring goes "off" concurrently with the occurrence of an "early word pulse" (EWP).

The output from terminal 275 of double cathode follower 274 is also fed over line 276 to the diode 278 of a switch 279. Diode 281 of switch 279 has "negative D pulses" (NDP) applied thereto from line 156. When a positive voltage output occurs on terminal 275 of double cathode follower 274, a positive voltage is produced at the output of switch 279 except during the interval of a "negative D pulse" (NDP). The output of switch 279 is fed through isolation diode 282, over line 283, and over line 284 to the terminal 285 of a double inverter 286. The output from the terminal 287 of double inverter 286 is fed to the input terminal 288 of double cathode follower 274 to produce an output at the terminal 289. An output at terminal 289 causes a glow tube 291 to light indicating an error. The output from terminal 289 is also fed over line 292 to isolation diodes 293 and 294. The output from terminal 289 is fed through diode 293, over lines 295 and 284 to terminal 285 of double inverter 286 to maintain an output from terminal 289 of double cathode follower 274. This output is maintained until the negative voltage source is removed from terminal 296 of double inverter 286 by a switch, not shown. The output from terminal 289 of double cathode follower 274 is also fed through diode 294 over line 297 to the input terminals 298 of a double cathode follower 299. The output from double cathode follower 299 may be taken from a terminal 300 to effect desired controls in a data processing machine.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine, timing and clocking mechanism comprising in combination; a rotating magnetic drum assembly for producing a first array of time spaced pulses and a second array of time spaced pulses, said second array of time spaced pulses bearing a predetermined relation to said first array of time spaced pulses; an open ended ring having a plurality of stages and a cycle time corresponding to the time space between adjacent pulses of said first array of time spaced pulses; means for coupling said magnetic drum assembly to the first stage of said plurality of stages to initiate a cycle of said ring upon the occurrence of each pulse of said first array of pulses; means for coupling said magnetic drum assembly to each stage of said ring so that said ring is advanced one stage upon the occurrence of each pulse of said second array of pulses, means for generating a signal as said ring is advanced through the last stage of said plurality of stages; and means responsive to said signal and to each pulse of said first array of pulses for producing an error indication upon the occurrence of a pulse of said first array of pulses or upon the occurrence of said signal without the occurrence of both said signal and a pulse of said first array of pulses.

2. In a data processing machine, timing and clocking mechanism comprising in combination, a source of time spaced pulses, an open ended ring having a plurality of stages, means for coupling said source of time spaced pulses to the first stage of said plurality of stages to initiate a cycle of said ring upon the occurrence of each of said pulses, driving means for advancing said ring through said plurality of stages in a time equal to the time space between adjacent ones of said pulses to complete a ring cycle, means responsive to the last stage of said plurality of stages for generating a signal upon the completion of a cycle by said ring, and means responsive to each of said pulses and to said signal for producing an error indication upon the occurrence of one of said pulses or upon the occurrence of said signal without the occurrence of both said signal and one of said pulses.

3. Apparatus as defined in claim 2 wherein said driving means comprises a rotating magnetic drum assembly having a first track with magnetic spots recorded thereon.

4. Apparatus according to claim 3 wherein said source of time spaced pulses comprises a second track on said magnetic drum assembly with magnetic spots recorded thereon, the spacing of the magnetic spots on said first track bearing a predetermined relation to the spacing of the magnetic spots on said second track.

5. In a data processing machine, timing and clocking mechanism comprising in combination, a source of first time spaced pulses, a cyclically operable ring having a cycle time corresponding to the time space between adjacent ones of said first time spaced pulses, a source of second pulses having a predetermined time spacing in relation to the time spacing of the first time spaced pulses for advancing said ring, means connected to said ring for generating a signal in response to the completion of a ring cycle, and means responsive to each of said first time spaced pulses and to said signal for producing an error indication upon the occurrence of one of said first time spaced pulses or upon the occurrence of said signal without the occurrence of both said signal and one of said first time spaced pulses.

6. In a data processing machine, timing and clocking mechanism comprising in combination, a source of first time spaced pulses, a cyclically operable commutator adapted to be advanced through a cycle in a time equal to the time space between adjacent ones of said first time spaced pulses, a source of second pulses having a predetermined time spacing in relation to the time spacing of the first time spaced pulses for advancing said commutator, means under control of said commutator for generating a signal in response to the completion of a cycle by said commutator, and means responsive to each of said first time spaced pulses and to said signal for producing an error indication upon the occurrence of one of said first time spaced pulses or upon the occurrence of said signal without the occurrence of both said signal and one of said first time spaced pulses.

7. In a data processing machine, timing and clocking mechanism comprising in combination, a source of first time spaced pulses, a cyclically operable ring adapted to be advanced through a cycle in a time equal to the time space between adjacent ones of said first time spaced pulses, a source of second pulses having a predetermined time spacing in relation to the time spacing of the first time spaced pulses for advancing said ring, means under control of said ring for generating a signal upon the completion of each cycle by said ring, and means responsive to each of said first time spaced pulses and to said signal for producing an error indication upon the occurrence of one of said first time spaced pulses or upon the occurrence of said signal without the occurrence of both said signal and one of said first time spaced pulses.

8. In a data processing machine, timing and clocking mechanism comprising in combination a source of first time spaced pulses, an open ended ring having a plurality of stages and adapted to be advanced through said plurality of stages in a time corresponding to the time space between adjacent ones of said first time spaced pulses, a source of second time spaced pulses having a predetermined time spacing in relation to the time spacing of the first time spaced pulses for advancing said ring, means responsive to a particular stage of said ring for generating a signal upon the advance of said ring through said particular stage, and means responsive to each of said first time spaced pulses and to said signal for producing an error indication upon the occurrence of one of said first time spaced pulses or upon the occurrence of said signal without the occurrence of both said signal and one of said first time spaced pulses.

9. In a data processing machine, timing and clocking mechanism comprising in combination, a source of first time spaced pulses, an open ended ring having a plurality of stages and adapted to be advanced through said plurality of stages in a time equal to the time space between adjacent ones of said pulses, means for coupling said source of first time spaced pulses to the first stage of said plurality of stages to initiate a cycle of said ring upon the occurrence of each of said first time spaced pulses, a source of second pulses having a predetermined time spacing in relation to the time spacing of the first time spaced pulses for advancing said ring through said plurality of stages after the initiation of each cycle, means responsive to the last stage of said plurality of stages for generating a signal upon the advance of said ring through said last stage, and means responsive to each of said first time spaced pulses and to said signal for producing an error indication upon the occurrence of one of said first time spaced pulses or upon the occurrence of said signal without the occurrence of both said signal and one of said first time spaced pulses.

References Cited in the file of this patent

UNITED STATES PATENTS

| | | |
|---|---|---|
| 2,597,428 | Bachelet | May 20, 1952 |
| 2,609,439 | Marshall et al. | Sept. 2, 1952 |
| 2,614,169 | Cohen et al. | Oct. 14, 1952 |
| 2,623,108 | Holden | Dec. 23, 1952 |
| 2,679,638 | Bensky et al. | May 25, 1954 |
| 2,680,155 | Molnar | June 1, 1954 |
| 2,685,683 | Holden et al. | Aug. 3, 1954 |